(12) United States Patent
Wang

(10) Patent No.: US 12,738,564 B2
(45) Date of Patent: Sep. 15, 2026

(54) BOX OF BATTERY, BATTERY, ELECTRICAL APPARATUS, AND METHOD AND APPARATUS FOR PREPARING BATTERY

(71) Applicant: CONTEMPORARY AMPEREX TECHNOLOGY (HONG KONG) LIMITED, Hong Kong (CN)

(72) Inventor: Liangyi Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 166 days.

(21) Appl. No.: 18/676,529

(22) Filed: May 29, 2024

(65) Prior Publication Data

US 2024/0313294 A1 Sep. 19, 2024

Related U.S. Application Data

(63) Continuation of application No. PCT/CN2023/070776, filed on Jan. 5, 2023.

(30) Foreign Application Priority Data

Jan. 13, 2022 (CN) ........................ 202210038840.1

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 50/244* (2021.01); *H01M 50/249* (2021.01)

(58) Field of Classification Search
CPC ........... H01M 10/6556; H01M 10/613; H01M 50/244; H01M 50/249; H01M 10/63;
(Continued)

(56) References Cited

U.S. PATENT DOCUMENTS

2015/0357616 A1 12/2015 Morisaku et al.

FOREIGN PATENT DOCUMENTS

CN 207217633 U 4/2018
CN 207217635 * 4/2018
(Continued)

OTHER PUBLICATIONS

International Search Report received in the corresponding international application PCT/CN2023/070776, mailed on Mar. 22, 2023.
(Continued)

*Primary Examiner* — Lisa S Park
(74) *Attorney, Agent, or Firm* — K&L Gates LLP

(57) ABSTRACT

Provided are a box of a battery, a battery, an electrical apparatus, and a method and apparatus for preparing a battery. The box and the battery in which it is located have better performance. The box of the battery includes: a thermal management component configured to accommodate a fluid to adjust the temperature of the battery, an end region of a first edge of the thermal management component being provided with a protrusion which protrudes outwardly in a first direction (x), the first direction (x) being parallel to the first edge of the thermal management component, and the protrusion and a second edge of the thermal management component forming a recess; and a connecting plate accommodated in the recess and connected to the second edge and the protrusion.

15 Claims, 8 Drawing Sheets

(51) Int. Cl.
*H01M 50/244* (2021.01)
*H01M 50/249* (2021.01)

(58) Field of Classification Search
CPC ........... H01M 2220/20; H01M 10/615; H01M 10/625; H01M 10/6568; H01M 50/209; H01M 50/258; H01M 50/291; H01M 50/204; H01M 10/62; H01M 10/6561; H01M 10/6567; Y02E 60/10
See application file for complete search history.

(56) References Cited

FOREIGN PATENT DOCUMENTS

| | | | | |
|---|---|---|---|---|
| CN | 207217635 | U | | 4/2018 |
| CN | 207250613 | U | | 4/2018 |
| CN | 110434424 | A | | 11/2019 |
| CN | 209747588 | U | | 12/2019 |
| CN | 110762088 | | * | 2/2020 |
| CN | 111211266 | A | | 5/2020 |
| CN | 111211373 | A | | 5/2020 |
| CN | 111231700 | A | | 6/2020 |
| CN | 111261819 | A | | 6/2020 |
| CN | 111801189 | A | | 10/2020 |
| CN | 211828940 | U | | 10/2020 |
| CN | 111952691 | A | | 11/2020 |
| CN | 212571214 | U | | 2/2021 |
| CN | 112705906 | A | | 4/2021 |
| CN | 112786312 | A | | 5/2021 |
| CN | 112787022 | A | | 5/2021 |
| CN | 214477762 | | * | 10/2021 |
| CN | 214477762 | U | | 10/2021 |
| CN | 215220919 | | * | 12/2021 |
| JP | 2019106313 | A | | 6/2019 |

OTHER PUBLICATIONS

The Notice of Reasons for Refusal received in the counterpart JP Application 2024-518174, dated May 1, 2025, 10 pages with English translation.

Office Action (with English Machine Translation), mailed Oct. 10, 2025, for corresponding Chinese Patent Application Serial No. 202210038840.1.

The extended European search report received in the counterpart European Application 23739892.0, mailed on Jan. 23, 2025.

Notice of Allowance (with English Machine Translation), mailed Apr. 2, 2026, for corresponding Korean Patent Application Serial No. 10-2024-7011429.

Office Action (with English Machine Translation), mailed Jun. 10, 2026, for corresponding Chinese Patent Application Serial No. 202210038840.1.

* cited by examiner

BOX OF BATTERY, BATTERY, ELECTRICAL APPARATUS, AND METHOD AND APPARATUS FOR PREPARING BATTERY

CROSS-REFERENCE TO RELATED APPLICATION

The present application is continuation of International Application No. PCT/CN2023/070776, filed Jan. 5, 2023, which claims the priority of Chinese Patent Application No. 202210038840.1, entitled "BOX OF BATTERY, BATTERY, ELECTRICAL APPARATUS, AND METHOD AND APPARATUS FOR PREPARING BATTERY" and filed on Jan. 13, 2022, which is incorporated herein by reference in its entirety.

TECHNICAL FIELD

Embodiments of the present application relate to the field of batteries, and in particular, to a box of a battery, a battery, an electrical apparatus, and a method and apparatus for preparing a battery.

BACKGROUND

Energy conservation and emission reduction are the key to the sustainable development of the automobile industry. In this case, electric vehicles have become an important part of the sustainable development of the automobile industry because of their advantages of energy saving and environmental friendliness. For electric vehicles, battery technology is an important factor related to their development.

In some battery technologies, a battery is formed by at least one battery cell. In order to ensure the mounting stability of multiple battery cells in an electric vehicle, the battery further includes a box for accommodating the at least one battery cell. As part of the battery, the performance of the box will also affect the overall performance of the battery.

Therefore, how to improve the performance of the box and the battery in which it is located is an urgent technical problem to be solved in the battery technology.

SUMMARY OF THE INVENTION

The present application provides a box of a battery, a battery, an electrical apparatus, and a method and apparatus for preparing a battery. The box and the battery in which it is located have better performance.

In a first aspect, a box of the battery is provided, the box including: a thermal management component configured to accommodate a fluid to adjust the temperature of the battery, an end region of a first edge of the thermal management component being provided with a protrusion which protrudes outwardly in a first direction, the first direction being parallel to the first edge of the thermal management component, and the protrusion and a second edge of the thermal management component forming a recess; and a connecting plate accommodated in the recess and connected to the second edge and the protrusion.

Through the technical solution of the embodiment of the present application, the box of the battery includes a thermal management component to realize the integration of the thermal management component and the box. While the thermal management component is used to achieve thermal management of an electrical component inside the box, it is also possible to save the internal space of the box to increase the energy density of the battery. On this basis, the first edge of the thermal management component protrudes in the first direction parallel to the first edge to form a protrusion, and the protrusion and the second edge of the thermal management component form a recess. The recess is configured to accommodate the connecting plate, and the connecting plate may be connected to the protrusion and the second edge to achieve connection between the connecting plate and the thermal management component. Where the connection between the connecting plate and the thermal management component is achieved by a welding process, through the above design of the thermal management component, a welding joint between the connecting plate and the thermal management component will not be located at the first edge of the thermal management component, and the first edge of the thermal management component can be connected to other structural members without introducing a gap that affects the sealing of the box. Naturally, there is no need to seal the gap by an additional process such as arc welding. Therefore, through the technical solution of the embodiment of the present application, it is possible to avoid problems such as deformation of the box caused by sealing the gap through arc welding and additional increase in the weight of the box. The box provided in the embodiment of the present application can have higher reliability, smaller weight and higher energy density.

In some possible embodiments, the connecting plate is welded to the second edge and the protrusion by a friction stir welding process.

The friction stir welding (FSW) process can more easily achieve welding of along weld seam, and the welding reliability is high. Therefore, in the technical solution of the embodiments, the FSW process can better achieve reliable connection between the connecting plate and the thermal management component. In addition, the heat input of the FSW process is small and the heat-affected area is small. Therefore, the deformation of the connecting plate and the thermal management component is also relatively small, and the welding yield between the two is high, facilitating the improvement of the usage reliability of the box and the reduction of the manufacturing cost. In addition, for the thermal management component, since the deformation caused by the FSW process is small, the influence of the FSW process on a flow channel cavity in the thermal management component is also small, and the FSW process will not cause welding penetration of the flow channel cavity, thereby further ensuring the manufacturing yield and usage reliability of the box.

In some possible embodiments, a flow channel cavity is provided in the thermal management component, and a cavity wall of the flow channel cavity has a thickness less than or equal to 1.5 mm.

Through the technical solution of the embodiments, the flow channel cavity in the thermal management component is designed to be thin-walled, that is, the thickness of the cavity wall of the flow channel cavity is less than or equal to 1.5 mm, so that it is possible to reduce the overall mass of the thermal management component and facilitate the mounting of the box in an electrical apparatus, and also to further increase the energy density of the battery.

In some possible embodiments, a mounting beam is provided on the connecting plate, and the mounting beam extends in a second direction parallel to the second edge and is configured to mount components in the battery.

Through the technical solution of the embodiments, the mounting beam is provided on the connecting plate to realize the mounting of relevant components in the battery, such as the mounting of the battery cell and other parts of the box, so that while ensuring the stability of the mounting of the relevant components, it can also ensure that the mounting process of the relevant components will not affect the thermal management component, and the thermal management component can thus provide a good thermal management function for the battery cell in the box.

In some possible embodiments, the mounting beam and the connecting plate are of an integrated structure.

Through the technical solution of the embodiments, the mounting beam and the connecting plate are designed as an integrated structure, so that it is possible to improve the connection strength of the mounting beam on the connecting plate, to in turn improve the mounting stability of relevant components in the battery, and to improve the usage reliability of the battery.

In some possible embodiments, the box further includes: a mounting block provided on the protrusion, the mounting block abuts against the mounting beam, and the mounting block cooperates with the mounting beam and is configured to mount components in the battery.

Through the technical solution of the embodiments, the mounting block is provided in the box at a position corresponding to the protrusion, and the mounting block abuts against the mounting beam, so that the mounting block can not only seal the gap between the protrusion and other parts of the box to ensure the airtightness of the box, but can also be used together with the mounting beam to mount the components in the battery to further improve the mounting stability of the relevant components in the battery in the box.

In some possible embodiments, the mounting block is welded to the protrusion by an arc welding process.

Through the technical solution of the embodiments, the arc welding process is flexible and adaptable, and can be better suited to the welding of the small mounting block, so that the mounting block can achieve a better welding effect on the protrusion and improve the connection strength of the mounting block on the protrusion.

In some possible embodiments, a water access cavity is provided in the protrusion, and a cavity wall of the water access cavity that faces the mounting block has a thickness greater than or equal to 2 mm.

When the mounting block is welded to the protrusion by the arc welding process, the arc welding temperature is relatively high. Therefore, in order to reduce the influence of the arc welding process on the protrusion, especially the influence of the arc welding process on the water access cavity in the protrusion, through the technical solution of the embodiments, the thickness of the cavity wall of the water access cavity that faces the mounting block is designed to be large, that is, greater than or equal to 2 mm, so that it is possible to ensure that the water access cavity is not welded through, thereby ensuring that the fluid can smoothly pass through the water access cavity into the flow channel cavity to ensure the thermal management function of the thermal management component.

In some possible embodiments, the thermal management component includes two first edges parallel to each other, and end regions of the two first edges that are located on the same side are each provided with the protrusion which protrudes outwardly in the first direction; and the second edge is connected to the two protrusions to form the recess.

Through the technical solution of the embodiments, the welding joint between the connecting plate and the thermal management component will not be located at the two first edges of the thermal management component, and the two first edges of the thermal management component both can be connected to other structural members, to ensure the structural reliability of the box without introducing a gap that affects the sealing of the box. Through this technical solution, the usage reliability of the box can be further improved.

In some possible embodiments, end regions located on two sides of each of the two first edges are each provided with the protrusion which protrudes outwardly in the first direction; and the thermal management component includes two second edges parallel to each other, and each second edge is connected to two respective protrusions to form one recess.

Through the technical solution of the embodiments, the two second edges of the thermal management component can respectively form recesses to accommodate two connecting plates. The mutual welding between the two connecting plates and the thermal management component will not create welding gaps, so as to ensure the airtightness of the box. Moreover, the mounting of the relevant components in the battery by means of the mounting beams on the two connecting plates can further improve the mounting stability of the relevant components in the battery.

In some possible embodiments, the thermal management component includes: at least two parts welded to each other, and a weld seam between the at least two parts is parallel to the first edge and perpendicular to the second edge.

Through the technical solution of the embodiments, when the thermal management component has a large area, the thermal management component can be split into multiple parts and manufactured separately to ensure the manufacturing yield of each part and thus ensure the overall performance of the thermal management component. Moreover, an "I"-shaped weld seam may be formed in the thermal management component, so that the strength of the weld seam of the box can be enhanced, thereby improving the overall strength of the box.

In some possible embodiments, a support beam extending in the first direction is provided on the first edge of the thermal management component and the protrusion.

Through the technical solution of the embodiments, a support beam extending in the first direction is provided on the first edge of the thermal management component and the protrusion, so that the support beam can support the entire box in the first direction and improve the overall stiffness and strength of the box to ensure the usage reliability of the box.

In some possible embodiments, the support beam and the thermal management component are of an integrated structure.

Through the technical solution of the embodiments, the support beam and the thermal management component are designed as an integrated structure, so that it is possible to improve the connection strength of the support beam on the thermal management component, thereby further improving the overall stiffness and strength of the box to further ensure the usage reliability of the box.

In some possible embodiments, the thermal management component and the connecting plate are connected to each other to form a bottom plate of the box.

Through the technical solution of the embodiments, when the battery is in use, the bottom plate and the thermal management component on the bottom plate are located on the side of the box facing the direction of gravity. The thermal management component can be designed to have a large area to achieve a better thermal management effect. In addition, even if a battery cell in the battery is activated and the high-temperature emissions therein cause damage to the thermal management component, the fluid leaking from the thermal management component will not affect other battery cells, thereby ensuring the normal operation of the other battery cells.

In some possible embodiments, the thermal management component and the connecting plate are made of aluminum.

Through the technical solution of the embodiments, it is possible to easily form the mounting beam on the connecting plate by an aluminum extrusion process, and to form the support beam on the thermal management component, thereby improving the connection strength of the mounting beam and the support beam on the connecting plate and thermal management component. In addition, the aluminum material has the advantages of light weight, good thermal conductivity, easy processing, excellent corrosion resistance, and good strength; therefore, the thermal management component made of the aluminum material can meet the requirements for both strength and thermal conductivity, and is also more suitable to be integrated into the box as part of the box.

In a second aspect, a battery is provided, including: a battery cell, and a box in the first aspect or according to any possible embodiment in the first aspect, the box being configured to accommodate the battery cell.

In a third aspect, an electrical apparatus is provided, including: a battery in the second aspect, the battery being configured to supply electric energy to the electrical apparatus.

In a fourth aspect, a method of preparing a battery is provided, the method including: providing a battery cell; provide a box, the box including: a thermal management component configured to accommodate a fluid to adjust the temperature of the battery cell, an end region of a first edge of the thermal management component being provided with a protrusion which protrudes outwardly in a first direction, the first direction being parallel to the first edge of the thermal management component, and the protrusion and a second edge of the thermal management component forming a recess; and a connecting plate accommodated in the recess and connected to the second edge and the protrusion; and accommodating the battery cell in the box.

In a fifth aspect, an apparatus for preparing a battery is provided, the apparatus including: a providing module configured to provide a battery cell and a box, the box including: a thermal management component configured to accommodate a fluid to adjust the temperature of the battery, an end region of a first edge of the thermal management component being provided with a protrusion which protrudes outwardly in a first direction, the first direction being parallel to the first edge of the thermal management component, and the protrusion and a second edge of the thermal management component forming a recess; and a connecting plate accommodated in the recess and connected to the second edge and the protrusion; and a mounting module configured to accommodate the battery cell in the box.

Through the technical solution of the embodiment of the present application, the box of the battery includes a thermal management component to realize the integration of the thermal management component and the box. While the thermal management component is used to achieve thermal management of an electrical component inside the box, it is also possible to save the internal space of the box to increase the energy density of the battery. On this basis, the first edge of the thermal management component protrudes in the first direction parallel to the first edge to form a protrusion, and the protrusion and the second edge of the thermal management component form a recess. The recess is configured to accommodate the connecting plate, and the connecting plate may be connected to the protrusion and the second edge to achieve connection between the connecting plate and the thermal management component. Where the connection between the connecting plate and the thermal management component is achieved by a welding process, through the above design of the thermal management component, a welding joint between the connecting plate and the thermal management component will not be located at the first edge of the thermal management component, and the first edge of the thermal management component can be connected to other structural members without introducing a gap that affects the sealing of the box. Naturally, there is no need to seal the gap by an additional process such as arc welding. Therefore, the box provided in the embodiment of the present application can have higher reliability, smaller weight and higher energy density.

DESCRIPTION OF DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without any creative effort.

Figure 1:
FIG. 1 is a schematic structural diagram of a vehicle disclosed in an embodiment of the present application.
Figure 1:
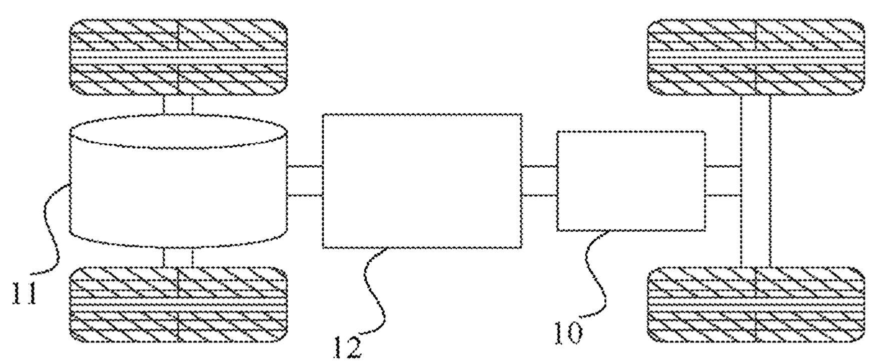

In the accompanying drawings, the figures are not necessarily drawn to scale.

DETAILED DESCRIPTION

Embodiments of the present application are described in further detail below in conjunction with the drawings and embodiments. The following detailed description of the embodiments and the drawings are configured to illustrate the principles of the present application by way of example, but should not be configured to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are used for descriptive purposes only, and cannot be construed as indicating or implying relative importance. "Perpendicular" is not strictly perpendicular, but within the allowable range of errors. "Parallel" is not strictly parallel, but within the allowable range of errors.

Orientation words appearing in the following description are all directions shown in the drawings, and do not limit the specific structure of the present application. In the description of the present application, it should also be noted that, unless otherwise expressly specified and limited, the terms "mount," "connected," and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

In the present application, the term "and/or" is only an association relationship for describing associated objects, indicating that three relationships may exist. For example, A and/or B may represent three situations: A exists, both A and B exist, and B exists. In addition, the character "/" in the present application generally means that the associated objects before and after it are in an "or" relationship.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the present application, the battery refers to a physical module that includes one or more battery cells to supply electric energy. For example, the battery mentioned in the present application may include a battery module, a battery pack, or the like. The battery generally includes a box for encapsulating one or more battery cells. The box can prevent liquid or other foreign matters from affecting charging or discharging of the battery cells.

Optionally, the battery cell may include a lithium-ion secondary battery, a lithium-ion primary battery, a lithium sulfur battery, a sodium lithium-ion battery, a sodium-ion battery or a magnesium-ion battery and so on, which will not be limited in the embodiments of the present application. The battery cell may be in a cylindrical shape, a flat shape, a cuboid shape or another shape, which is also not limited in the embodiments of the present application. The battery cells are generally classified into three types according to encapsulating manners: cylindrical battery cells, prismatic battery cells and pouch cells, which will also not be limited in the embodiments of the present application.

The battery cell includes an electrode assembly and an electrolytic solution, the electrode assembly being composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive tab. Taking a lithium-ion battery as an example, the positive electrode current collector may be of a material of aluminum, and the positive electrode active material may be lithium cobalt oxide, lithium iron phosphate, ternary lithium or lithium manganate, etc. The negative electrode plate includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The material of the negative electrode current collector may be copper, and the negative electrode active material may be carbon or silicon, etc. In order to ensure that no fusing occurs when a large current passes, there are a plurality of positive tabs which are stacked together, and there are a plurality of negative tabs which are stacked together. The separator may be made of polypropylene (PP), polyethylene (PE), etc. In addition, the electrode assembly may have a wound structure or a laminated structure, and the embodiments of the present application are not limited thereto.

With the development of the battery technology, it is necessary to consider many design factors, such as energy density, cycle life, discharge capacity, C-rate and other performance parameters. In addition, the safety of the battery should also be considered.

For the battery, the main safety hazard comes from the charging and discharging processes. In order to improve the safety performance of the battery, a pressure relief mechanism is generally provided for the battery cell. The pressure relief mechanism refers to an element or component that is actuated to relieve an internal pressure or heat when the internal pressure or temperature of the battery cell reaches a predetermined threshold. The predetermined threshold may be adjusted according to different design requirements. The predetermined threshold may depend on the material of one or more of the positive electrode plate, the negative electrode plate, the electrolytic solution and the separator in the battery cell. The pressure relief mechanism may take the form of an element or component that is sensitive to pressure or temperature, for example. That is, when the internal pressure or temperature of the battery cell reaches a predetermined threshold, the pressure relief mechanism is actuated, thereby creating a channel through which the internal pressure or heat can be relieved.

By “actuate” mentioned in the present application means that the pressure relief mechanism generates an action such that the internal pressure and heat can be relieved from the battery cell. The action generated by the pressure relief mechanism may include, but not limited to, at least a part of the pressure relief mechanism being broken, torn or melted. After the pressure relief mechanism is actuated, high-temperature and high-pressure substances inside the battery cell are discharged outwardly from the pressure relief mechanism as emissions. In this way, the pressure and heat in the battery cell can be released at a controllable pressure or temperature, thereby avoiding potential, more serious accidents.

The emissions from the battery cell mentioned in the present application include, but are not limited to: an electrolytic solution, dissolved or split positive and negative electrode plates, fragments of a separator, high-temperature and high-pressure gas generated by reaction, flames, etc.

The pressure relief mechanism on the battery cell has an important impact on the safety of the battery. For example, when short circuit, overcharge and other phenomena occur on the battery cell, it is possible to lead to thermal runaway inside the battery cell, resulting in a sudden increase in pressure or temperature. In this case, the internal pressure and heat can be released outward through the actuation of the pressure relief mechanism, to prevent the battery cell from exploding and catching fire.

In addition to the pressure relief mechanism provided on the battery cell to ensure the safety of the battery, a thermal management component may also be provided in the box for accommodating the battery cell. The thermal management component can be used to accommodate a fluid to regulate the temperature of a plurality of battery cells. The fluid here may be liquid or gas, and temperature regulation means heating or cooling the plurality of battery cells. In the case of cooling or lowering the temperature of the battery cells, the thermal management component is configured to accommodate a cooling fluid to lower the temperature of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component can also be used for heating to raise the temperature of the plurality of battery cells, which is not limited by the embodiments of the present application. Optionally, the fluid may flow in a circulating manner to achieve a better temperature regulation effect. Optionally, the fluid may be water, a mixture of water and ethylene glycol, or air, etc.

In some related technologies, in order to improve the energy density of the battery and save space in the box of the battery, the thermal management component is integrated with the box of the battery. In other words, the box of the battery is not only used to accommodate the battery cell, but can also be used as the thermal management component to regulate the temperature of the battery cell in the box.

For example, in some embodiments, the thermal management component may be a water-cooling plate structure. Four borders are respectively provided around the water-cooling plate structure. The four borders may respectively surround and be welded to the water-cooling plate by a welding process to form part of the box of the battery. Specifically, the four borders include front, rear, left, and right borders. The length of the front border and the rear border may be the same as the length of the short side of the water-cooling plate, and the length of the left border and the right border may be equal to the sum of the length of the long side of the water-cooling plate, the width of the front border, and the width of the rear border. During welding, the front border and the rear border may be welded to the two short sides of the water-cooling plate respectively, and then the left border and the right border may be welded to the two long sides of the water-cooling plate and the front and rear borders respectively. During the welding, a welding gap will be formed between the front and rear borders and four corners of the water-cooling plate. Therefore, it is necessary to seal the gap by an arc welding (also called TIG welding) process to ensure the airtightness of the box. In the embodiments, the arc energy of arc welding is high, so that it is likely to cause the box to deform, and there is a risk of welding through the water-cooling plate, affecting the reliability of the box and the water-cooling effect of the water-cooling plate. Moreover, too much arc welding will also result in increased weight of the box, affecting the energy density of the battery.

In view of this, the present application provides a box of a battery. The box of the battery includes a thermal management component to achieve integration of the thermal management component and the box. On this basis, a first edge of the thermal management component protrudes outwardly to form a protrusion, and the protrusion and a second edge of the thermal management component form a recess. The recess is configured to accommodate a connecting plate, and the connecting plate may be connected to the protrusion to achieve connection between the connecting plate and the thermal management component. Where the connection between the connecting plate and the thermal management component is achieved by a welding process, through the above design of the thermal management component, a welding joint between the connecting plate and the thermal management component will not be located at the first edge of the thermal management component, and the first edge of the thermal management component can be connected to other structural members without introducing a gap that affects the sealing of the box. Naturally, there is no need to seal the gap by an additional process such as arc welding. Therefore, the box provided in the embodiment of the present application can have higher reliability, smaller weight and higher energy density.

The technical solutions described in the embodiments of the present application are applicable to various apparatuses using batteries, such as electromobiles, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing apparatuses, but also applicable to all apparatuses using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel vehicle, a gas vehicle or a new energy vehicle. The new energy vehicle may be an all-electric vehicle, a hybrid vehicle or an extended-range electric vehicle, or the like. A motor 11, a controller 12 and a battery 10 may be provided inside the vehicle 1, and the controller 12 is configured to control the battery 10 to supply power to the motor 11. For example, the battery 10 may be arranged at the bottom or the head or the tail of the vehicle 1. The battery 10 may be configured to supply power to the vehicle 1, for example, the battery 10 may be used as an operating power source of the vehicle 1, which is used for a circuit system of the vehicle 1, for example, for operation power requirements of the vehicle 1 during starting, navigation and running. In another embodiment of the present application, the battery 10 can be used not only as an operation power supply of the vehicle 1, but also as a driving power supply of the vehicle 1, replacing or partially replacing fuel or natural gas to provide driving power for the vehicle 1.

In order to meet different power requirements, the battery may include a plurality of battery cells, wherein the plurality of battery cells may be in series connection, parallel connection or parallel-series connection. The parallel-series connection refers to a combination of series connection and parallel connection. The battery may also be called a battery pack. Optionally, the plurality of battery cells may be first connected in series, in parallel or in parallel-series connection to form battery modules, and then the multiple battery modules are connected in series, in parallel or in parallel-series connection to form a battery. That is to say, a plurality of battery cells may directly constitute a battery, or may constitute battery modules, which then constitute a battery.

Figure 2:
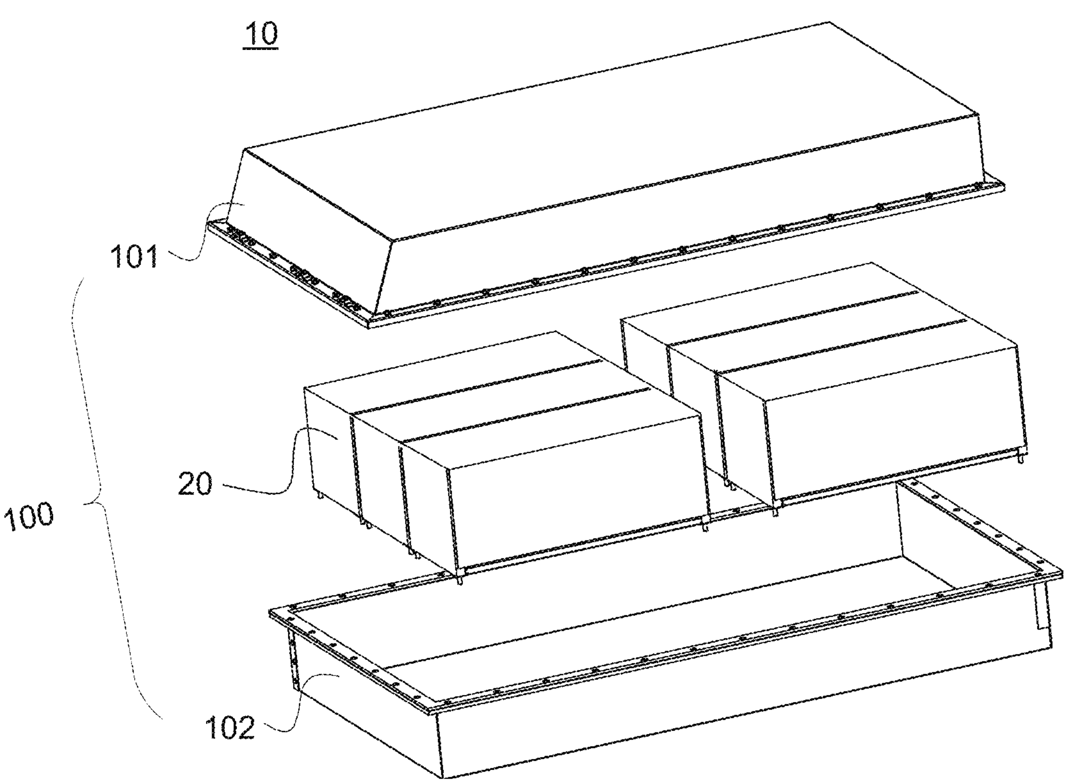
FIG. 2 is a schematic structural diagram of a battery disclosed in an embodiment of the present application.

For example, as shown in FIG. 2, which is a schematic structural diagram of a battery 10 according to an embodiment of the present application, the battery 10 may comprise a plurality of battery cells 20. The battery 10 may further comprise a box 100 (or an enclosure). The interior of the box 100 is a hollow structure, and the plurality of battery cells 20 are accommodated in the box 100. As shown in FIG. 2, the box 100 may comprise two portions, which are referred to as a first portion 101 and a second portion 102, respectively, and the first portion 101 and the second portion 102 are fastened together. The shapes of the first portion 101 and the second portion 102 may be determined according to the shape of the combined plurality of battery cells 20, and the first portion 101 and the second portion 102 may each have an opening. For example, the first portion 101 and the second portion 102 each may be a hollow cuboid and each have only one surface with an opening, and the opening of the first portion 101 is arranged opposite to the opening of the second portion 102. The first portion 101 and the second portion 102 are fastened to each other to form a box 100 with a closed chamber. The plurality of battery cells 20 are combined in parallel connection or in series connection or in parallel-series connection and are then placed in the box 100 formed by fastening the first portion 101 to the second portion 102.

Optionally, the battery 10 may further include other structures, which will not be described in detail herein. For example, the battery 10 may also comprise a bus component. The bus component is configured to implement the electric connection between the plurality of battery cells 20, such as parallel connection, series connection or parallel-series connection. Specifically, the bus component may implement the electrical connection between the battery cells 20 by connecting electrode terminals of the battery cells 20. Further, the bus component may be fixed to the electrode terminals of the battery cells 20 by welding. Electric energy of the plurality of battery cells 20 may be further led out through an electrically conductive mechanism penetrating the box. Optionally, the electrically conductive mechanism may also belong to the bus component.

Depending on different power requirements, the number of battery cells 20 may be set to any value. The plurality of battery cells 20 can be connected in series, in parallel or in parallel-series connection to implement larger capacity or power. Since there may be many battery cells 20 included in each battery 10, the battery cells 20 may be arranged in groups for convenience of mounting, and each group of battery cells 20 constitute a battery module. The number of battery cells 20 included in the battery module is not limited and may be set as required.

Figure 3:
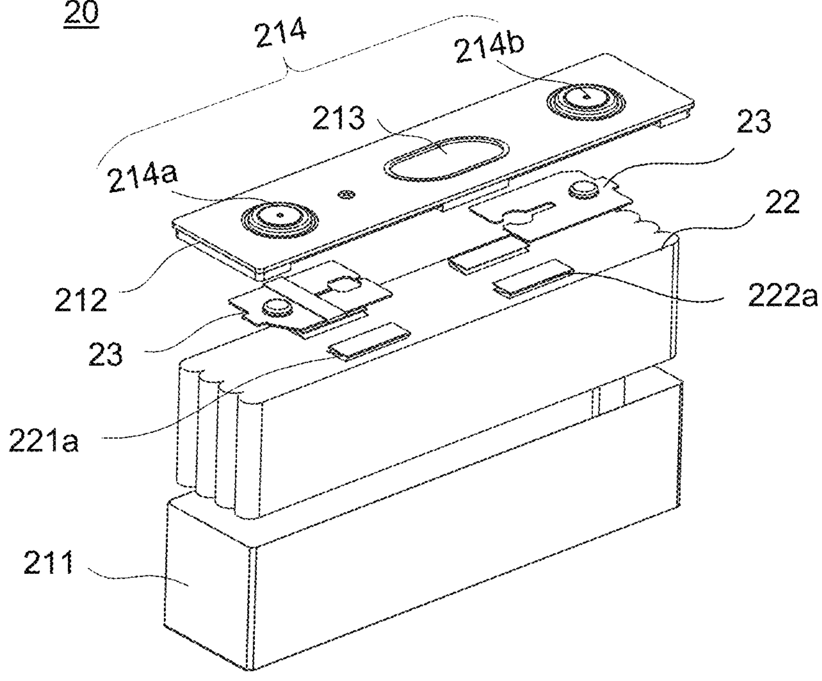
FIG. 3 is a schematic structural diagram of a battery cell disclosed in an embodiment of the present application.

FIG. 3 is a schematic structural diagram of a battery cell 20 according to an embodiment of the present application.

As shown in FIG. 3, the battery cell 20 includes one or more electrode assemblies 22, a housing 211 and a cover plate 212. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further comprise two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214*a* and a negative electrode terminal 214*b*, respectively. Each electrode terminal 214 is correspondingly provided with a connecting member 23 also called a current collecting member 23, which is located between the cover plate 212 and the electrode assembly 22 and configured to electrically connect the electrode assembly 22 to the electrode terminal 214.

As shown in FIG. 3, each electrode assembly 22 has a first tab 221*a* and a second tab 222*a*. The first tab 221*a* and the second tab 222*a* have opposite polarities. In this battery cell 20, according to actual use requirements, there may be a single or a plurality of electrode assemblies 22. As shown in FIG. 3, there are four separate electrode assemblies 22 in the battery cell 20.

As an example, a pressure relief mechanism 213 may also be provided on one wall of the battery cell 20. The pressure relief mechanism 213 is configured, when an internal pressure or temperature of the battery cell 20 reaches a threshold, to be actuated to relieve the internal pressure or heat.

Optionally, in an embodiment of the present application, the pressure relief mechanism 213 and the electrode terminals 214 are arranged on the same wall of the battery cell 20. For example, as shown in FIG. 3, the electrode terminals 214 and the pressure relief mechanism 213 both may be arranged on the top wall of the battery cell 20, that is, the cover plate 212. Optionally, in another embodiment of the present application, the pressure relief mechanism 213 and the electrode terminals 214 are arranged on different walls of the battery cell 20.

Optionally, when excessive gas generated by the battery cell 20 causes the internal pressure of the housing 211 to rise and reach a threshold, or the internal temperature of the battery cell 20 rises and reaches a threshold due to the heat generated by the internal reaction of the battery cell 20, the pressure relief mechanism 213 can be fractured at the indentation, resulting in the communication between the inside and outside of the housing 211. The gas pressure and heat are released outward through the cracking of the pressure relief mechanism 213, thereby preventing the battery cell 20 from exploding.

Figure 4:
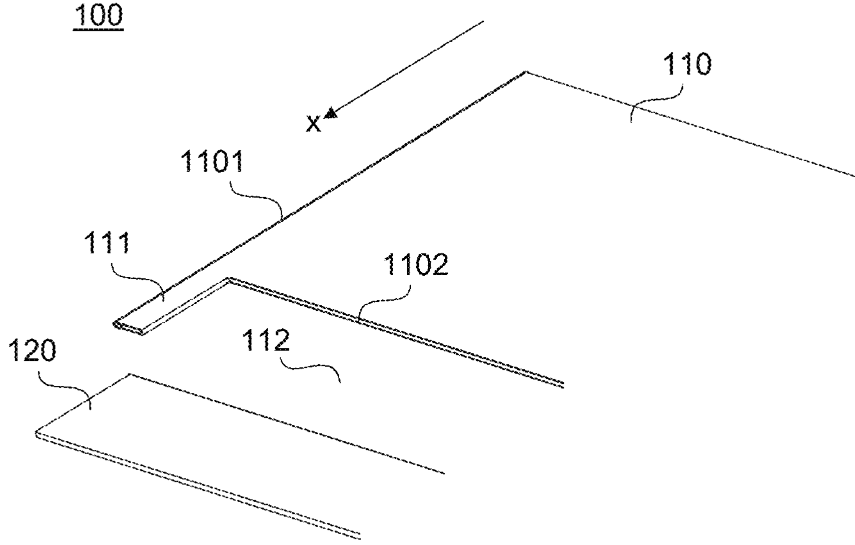
FIG. 4 is a schematic structural diagram of a box of a battery disclosed in an embodiment of the present application.

FIG. 4 shows a schematic structural diagram of a box 100 of a battery 10 according to an embodiment of the present application.

As shown in FIG. 4, in the embodiment of the present application, the box 100 of the battery 10 includes: a thermal management component 110. The thermal management component 110 is configured to accommodate a fluid to adjust the temperature of the battery 10, an end region of a first edge 1101 of the thermal management component 110 is provided with a protrusion 111 which protrudes outwardly in a first direction x, the first direction x is parallel to the first edge 1101 of the thermal management component 110, and the protrusion 111 and a second edge 1102 of the thermal management component 110 form a recess 112. In addition to the thermal management component 110, the box 100 further includes a connecting plate 120. The connecting plate 120 is accommodated in the recess 112 of the thermal management component 110 and connected to the second edge 1102 of the thermal management component 110 and the protrusion 111.

Specifically, in the embodiment shown in FIG. 4, the thermal management component 110 may be a plate-like structure, which is easily used as a wall of the box 100 to form a regular accommodating space for accommodating the battery cell 20 and other assemblies of the battery 10.

Optionally, in order to realize the thermal management function of the thermal management component 110, a flow channel cavity may be formed inside the thermal management component 110, and the flow channel cavity may be distributed inside the thermal management component 110. Moreover, the flow channel cavity may accommodate a fluid, and the fluid may be used to achieve thermal management of the battery cell 20 and other electrical components in the box 100.

For example, in some embodiments, the fluid may be a liquid. When the battery cell 20 in the battery 10 is in operation, due to the internal electrochemical reaction, the overall temperature of the battery cell 20 will be relatively high, causing a certain safety risk and also affecting the operation performance of the battery cell 20. In this case, the liquid in the thermal management component 110 can cool and reduce the temperature of the battery cell 20, thereby ensuring the operation of the battery cell 20 and improving the safety of the battery cell 20.

In the embodiments of the present application, the thermal management component 110 may be configured to form any wall in the box 100. Optionally, the thermal management component 110 may be configured to form a wall with a larger area of the box 100, thereby improving the thermal management effect of the thermal management component 110 on the electrical components inside the box 100.

In addition to the thermal management component 110, as shown in FIG. 4, the box 100 further includes a connecting plate 120. The connecting plate 120 and the thermal management component 110 are located on the same plane to facilitate their mutual connection for jointly forming a wall of the box 100.

Optionally, the connecting plate 120 accommodates no fluid. The connecting plate 120 can have a higher strength and stiffness to improve the overall strength and stiffness of the box 100. In addition, welding and other processes may be performed more conveniently on the connecting plate 120 to realize the connection between the connecting plate 120 and the thermal management component 110.

In order to realize the connection between the connecting plate 120 and the thermal management component 110, as shown in FIG. 4, the thermal management component 110 is designed as an irregular quadrilateral plate-like structure. Specifically, based on a regular quadrilateral plate-like structure, the end region of the first edge 1101 of the thermal management component 110 protrudes in the first direction x parallel to the first edge 1101 to form a protrusion 111. The protrusion 111 may also be a plate-like structure, which is located on the same plane as the thermal management component 110.

While forming the protrusion 111, a recess 112 is formed between the protrusion 111 and the second edge 1102 of the thermal management component 110. The shape and size of the recess 112 may be adapted to the shape and size of the connecting plate 120. For example, the shape and size of the recess 112 may be the same as the shape and size of the connecting plate 120 so that the connecting plate 120 can be well accommodated in the recess 112 and connected to the protrusion 111 and the second edge 1102 of the thermal management component 110.

Through the technical solution of the embodiment of the present application, the box 100 of the battery 10 includes a thermal management component 110 to realize the integration of the thermal management component 110 and the box 100. While the thermal management component 110 is used to achieve thermal management of an electrical component inside the box 100, it is also possible to save the internal space of the box 100 to increase the energy density of the battery 10. On this basis, the first edge 1101 of the thermal management component 110 protrudes in the first direction x parallel to the first edge 1101 to form a protrusion 111, and the protrusion 111 and the second edge 1102 of the thermal management component 110 form a recess 112. The recess 112 is configured to accommodate the connecting plate 120, and the connecting plate 120 may be connected to the protrusion 111 and the second edge 1102 to achieve connection between the connecting plate 120 and the thermal management component 110. Where the connection between the connecting plate 120 and the thermal management component 110 is achieved by a welding process, through the above design of the thermal management component 110, a welding joint between the connecting plate 120 and the thermal management component 110 will not be located at the first edge 1101 of the thermal management component 110, and the first edge 1101 of the thermal management component 110 can be connected to other structural members without introducing a gap that affects the sealing of the box 100. Naturally, there is no need to seal the gap by an additional process such as arc welding. Therefore, through the technical solution of the embodiment of the present application, it is possible to avoid problems such as deformation of the box 100 caused by sealing the gap through arc welding and additional increase in the weight of the box 100. The box 100 provided in the embodiment of the present application can have higher reliability, smaller weight and higher energy density.

Optionally, in some embodiments, the connecting plate 120 may be welded to the second edge 1102 of the thermal management component 110 and the protrusion 111 by a friction stir welding (FSW) process.

The FSW process can more easily achieve welding of a long weld seam, and the welding reliability is high. Therefore, in the technical solution of the embodiments, the FSW process can better achieve reliable connection between the connecting plate 120 and the thermal management component 110. In addition, the heat input of the FSW process is small and the heat-affected area is small. Therefore, the deformation of the connecting plate 120 and the thermal management component 110 is also relatively small, and the welding yield between the two is high, facilitating the improvement of the usage reliability of the box 100 and the reduction of the manufacturing cost. In addition, for the thermal management component 110, since the deformation caused by the FSW process is small, the influence of the FSW process on a flow channel cavity in the thermal management component 110 is also small, and the FSW process will not cause welding penetration of the flow channel cavity, thereby further ensuring the manufacturing yield and usage reliability of the box 100.

Where the connecting plate 120 is welded to the thermal management component 110 by the FSW process, as mentioned above, the FSW process has less impact on the thermal management component 110. Therefore, optionally, the flow channel cavity in the thermal management component 110 can have a thin-walled design. As an example, the thickness of the cavity wall of the flow channel cavity may be less than or equal to 1.5 mm.

Through the technical solution of the embodiments, the flow channel cavity in the thermal management component 110 is designed to be thin-walled, so that it is possible to reduce the overall mass of the thermal management component 110 and facilitate the mounting of the box 100 in an electrical apparatus, and also to further increase the energy density of the battery 10.

Figure 5:
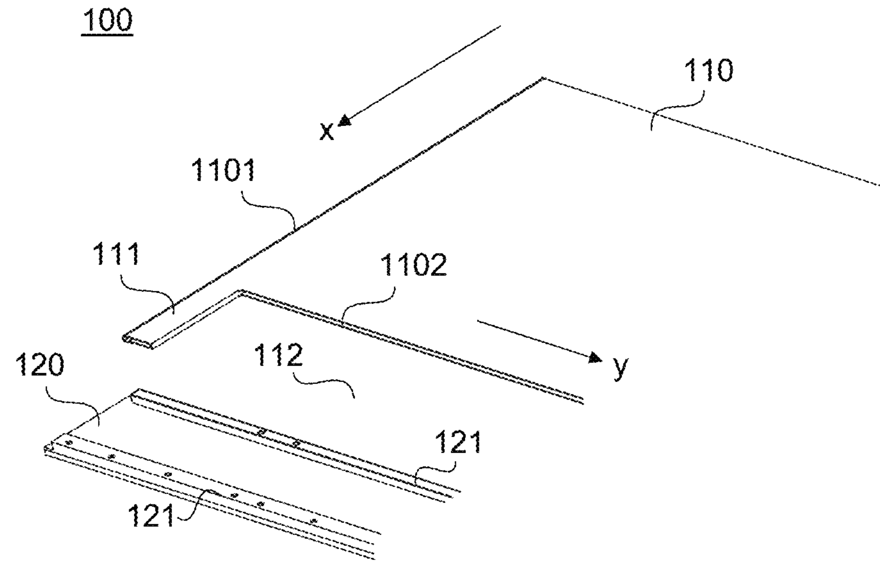
FIG. 5 is a schematic structural diagram of a box of a battery disclosed in another embodiment of the present application.

FIG. 5 shows a schematic structural diagram of a box 100 of a battery 10 provided in another embodiment of the present application.

As shown in FIG. 5, in the embodiment of the present application, a mounting beam 121 is provided on the connecting plate 120, and the mounting beam 121 extends in a second direction y. The second direction y is parallel to the second edge 1102 of the thermal management component 110, and the mounting beam 121 is configured to mount components in the battery 10.

Optionally, in the embodiment of the present application, the battery cell 20 in the battery 10 is arranged corresponding to the thermal management component 110 in the box 100. Since the thermal management component 110 accommodates a fluid, it is inconvenient to provide a relevant fixing structure on the thermal management component 110 to fix and mount the battery cell 20 or a battery module formed by the battery cell 20. In view of this, in order to improve the mounting stability of the battery cell 20 in the box 100, the mounting beam 121 is provided on the connecting plate 120, and can be used to mount the battery cell 20 or the battery module in the battery 10.

In addition, in addition to the mounting beam 121 for mounting the battery cell 20 in the battery 10, a mounting beam 121 for mounting other parts of the box 100 may be also provided on the connecting plate 120. As an example, in the embodiment of the present application, the thermal management component 110 and the connecting plate 120 are configured to form a bottom plate of the box 100. In order to facilitate the connection and mounting of the bottom plate and an upper cover of the box 100, a mounting beam 121 for mounting the upper cover of the box 100 is formed on the connecting plate 120.

Optionally, as shown in FIG. 5, two mounting beams 121 may be provided on the connecting plate 120, in which one mounting beam 121 close to the thermal management component 110 may be configured to mount the battery cell 20 or the battery module, and the other mounting beam 121 away from the thermal management component 110 may be configured to mount other parts of the box 100.

In addition, the two mounting beams 121 both extend in a second direction y, and the second direction y is parallel to the second edge 1102 of the thermal management component 110. Therefore, the arrangement of the mounting beams 121 can be adapted to the second edge 1102 of the thermal management component 110, and the mounting beams 121 may also have a relatively long extension length, thereby improving the mounting stability of the battery cell 20 and other parts of the box 100 on the mounting beams 121.

In summary, through the technical solution of the embodiment of the present application, the mounting beam 121 is provided on the connecting plate 120 to realize the mounting of relevant components in the battery 10, such as the mounting of the battery cell 20 and other parts of the box 100, while ensuring the stability of the mounting of the relevant components, it can also ensure that the mounting process of the relevant components will not affect the thermal management component 110, and the thermal management component 110 can thus provide a good thermal management function for the battery cell 20 in the box 100.

Optionally, in some embodiments, the mounting beam 121 and the connecting plate 120 are of an integrated structure.

As an example, the mounting beam 121 and the connecting plate 120 are both made of a metal material, and they may be prepared by an integral forming process to form an integrated structure. Optionally, the mounting beam 121 and the connecting plate 120 are both made of aluminum. The mounting beam 121 may be formed on the connecting plate 120 by an aluminum extrusion process, thereby forming an integrated structure.

Through the technical solution of the embodiments, the mounting beam 121 and the connecting plate 120 are designed as an integrated structure, so that it is possible to improve the connection strength of the mounting beam 121 on the connecting plate 120, to in turn improve the mounting stability of relevant components in the battery 10, and to improve the usage reliability of the battery 10.

Figure 6:
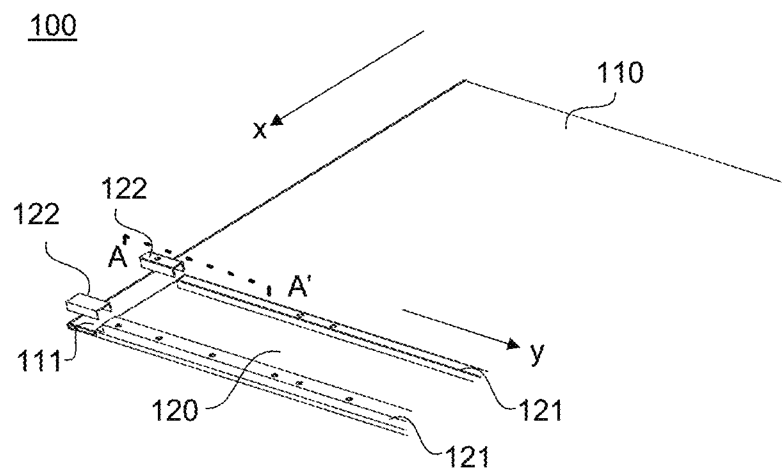
FIG. 6 is a schematic structural diagram of a box of a battery disclosed in another embodiment of the present application.

FIG. 6 shows a schematic structural diagram of a box 100 of a battery 10 provided in another embodiment of the present application.

As shown in FIG. 6, in the embodiment of the present application, the box 100 further includes: a mounting block 122 provided on the protrusion 111 of the thermal management component 110, the mounting block 122 abuts against the mounting beam 121, and the mounting block 122 cooperates with the mounting beam 121 and is configured to mount components in the battery 10.

Specifically, in the embodiment of the present application, in order to achieve good connection between the connecting plate 120 and the thermal management component 110, the thickness of the connecting plate 120 may be similar to or the same as the thickness of the thermal management component 110. When the connecting plate 120 is accommodated in the recess 112 of the thermal management component 110, the mounting beam 121 on the connecting plate 120 is higher than the plane where the connecting plate 120 and the thermal management component 110 are located. When the connecting plate 120 is connected to other parts of the box 100 via the mounting beam 121, a gap will be formed between the protrusion 111 and other parts of the box 100.

Therefore, in order to avoid the airtightness problem of the box 100 caused by the gap, the mounting block 122 is provided at a position corresponding to the protrusion 111, and the mounting block 122 abuts against the mounting beam 121, so that the mounting block can not only seal the gap between the protrusion 111 and other parts of the box 100 to ensure the airtightness of the box 100, but can also be used together with the mounting beam 121 to mount the components in the battery 10 to further improve the mounting stability of the relevant components in the battery 10 in the box 100.

Optionally, as shown in FIG. 6, the width dimension of the mounting block 122 in the first direction x may be similar to or the same as the width dimension of the mounting beam 121 in the first direction x. When the mounting block 122 is fixedly arranged on the protrusion 111, the mounting block 122 can be regarded as an extension of the mounting beam 121 on the protrusion 111 in the second direction y.

In some embodiments, the mounting block 122 may be welded to the protrusion 111 by an arc welding process to achieve fixation of the mounting block 122 on the protrusion 111.

Specifically, the arc welding process is flexible and adaptable, and can be better suited to the welding of the small mounting block 122, so that the mounting block 122 can achieve a better welding effect on the protrusion 111 and improve the connection strength of the mounting block 122 on the protrusion 111.

Figure 7:
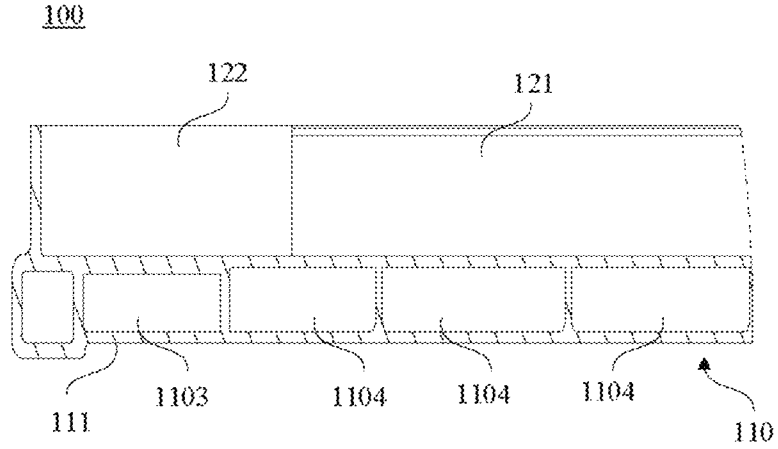
FIG. 7 is a schematic partial cross-sectional view taken along A-A' in FIG. 6.

FIG. 7 is a schematic partial cross-sectional view taken along A-A' in FIG. 6 after the mounting block 122 is welded to the protrusion 111.

As shown in FIG. 7, in the embodiment of the present application, a water access cavity 1103 is provided in the protrusion 111, and a cavity wall of the water access cavity 1103 that faces the mounting block 122 may have a thick-walled design. As an example, the cavity wall of the water access cavity 1103 that faces the mounting block 122 may have a thickness greater than or equal to 2 mm.

For ease of comparison, FIG. 7 also shows the flow channel cavity 1104 in the thermal management component 110. Referring to the relevant description of the above embodiments, the cavity wall of the flow channel cavity 1104 may have a thin-walled design. Therefore, the thickness of the cavity wall of the flow channel cavity 1104 may be less than that of the cavity wall of the water access cavity 1103 that faces the mounting block 122.

Specifically, in the embodiment of the present application, the water access cavity 1103 may be a water inlet cavity or a water outlet cavity of the thermal management component 110, and the fluid in the flow channel cavity 1104 of the thermal management component 110 can be introduced or discharged through the water access cavity 1103.

When the mounting block 122 is welded to the protrusion 111 by the arc welding process, the arc welding temperature is relatively high. Therefore, in order to reduce the influence of the arc welding process on the protrusion 111, especially the influence of the arc welding process on the water access cavity 1103 in the protrusion 111, the thickness of the cavity wall of the water access cavity 1103 that faces the mounting block 122 is designed to be large, so that it is possible to ensure that the water access cavity 1103 is not welded through, thereby ensuring that the fluid can smoothly pass through the water access cavity 1103 into the flow channel cavity 1104 to ensure the thermal management function of the thermal management component 110.

Optionally, still referring to FIG. 7, the cavity wall of the water access cavity 1103 that is away from the mounting block 122 is less affected by the arc welding process, and its thickness may be less than the thickness of the cavity wall of the water access cavity 1103 that is close to the mounting block 122, so as to reduce the overall mass of the thermal management component 110. As an example, in the embodiment shown in FIG. 7, the thickness of the cavity wall of the water access cavity 1103 that is away from the mounting block 122 is similar to or the same as the thickness of the cavity wall of the flow channel cavity 1104, and may also be less than or equal to 1.5 mm.

Figure 8:
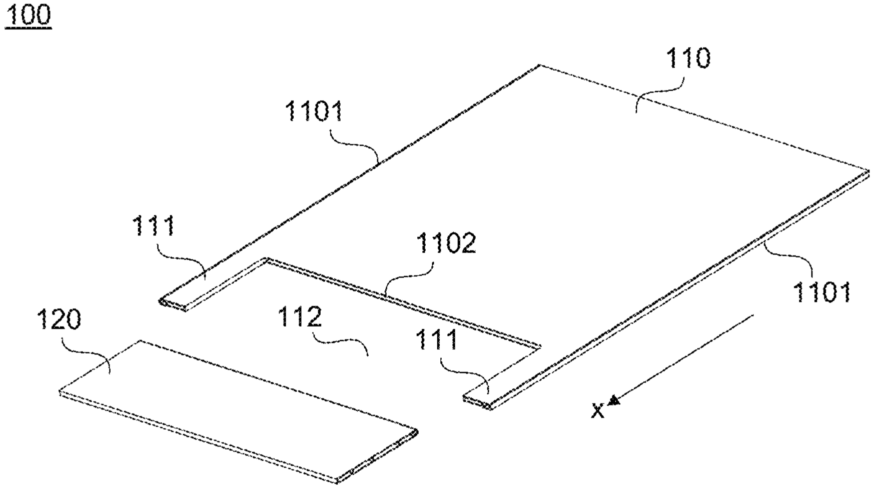
FIG. 8 is a schematic structural diagram of a box of a battery disclosed in another embodiment of the present application.

Based on the box 100 of the battery 10 shown in FIG. 4 above, FIG. 8 shows a schematic structural diagram of a box 100 of a battery 10 provided in another embodiment of the present application.

As shown in FIG. 8, in the embodiment of the present application, the thermal management component 110 includes two first edges 1101 that are parallel to each other. End regions of the two first edges 1101 that are located on the same side are each provided with the protrusion 111 which protrudes outwardly in the first direction x. The second edge 1102 of the thermal management component 110 is connected to the two protrusions 111 to form the recess 112.

Specifically, in the embodiment of the present application, the thermal management component 110 includes two protrusions 111 arranged axially symmetrically to each other. The two protrusions 111 and the second edge 1102 of the thermal management component 110 jointly form the recess 112 to accommodate the connecting plate 120.

Through the technical solution of the embodiment of the present application, the welding joint between the connecting plate 120 and the thermal management component 110 will not be located at the two first edges 1101 of the thermal management component 110, and the two first edges 1101 of the thermal management component 110 both can be connected to other structural members, to ensure the structural reliability of the box 100 without introducing a gap that affects the sealing of the box 100. Through this technical solution, the usage reliability of the box 100 can be further improved.

Figure 9:
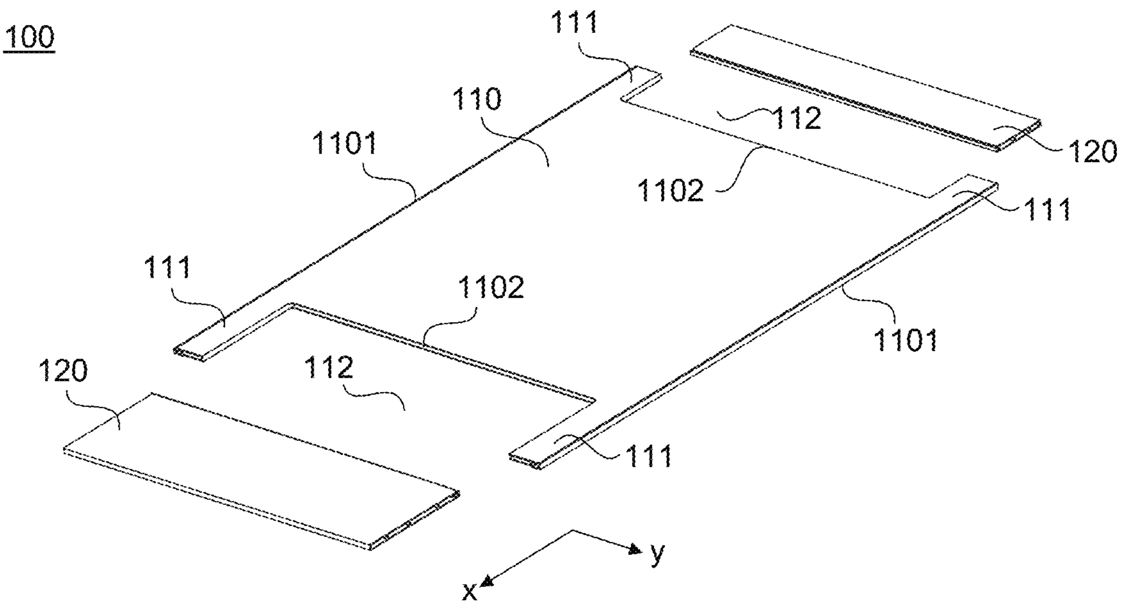
FIG. 9 is a schematic structural diagram of a box of a battery disclosed in another embodiment of the present application.

Based on the embodiment shown in FIG. 8, FIG. 9 shows a schematic structural diagram of a box 100 of a battery 10 provided in another embodiment of the present application.

As shown in FIG. 9, in the embodiment of the present application, end regions located on two sides of each first edge 1101 of the two first edges 1101 of the thermal management component 110 are each provided with the protrusion 111 which protrudes outwardly in the first direction x; and the thermal management component 110 includes two second edges 1102 parallel to each other, and each second edge 1102 of the two second edges 1102 is connected to the two protrusions 111 to form one recess 112.

Specifically, in the embodiment of the present application, a total of four protrusions 111 are formed at the two first edges 1101 of the thermal management component 110. The four protrusions 111 respectively form two recesses 112 with the two second edges 1102 of the thermal management component 110. Each recess 112 of the two recesses 112 may be configured to accommodate one connecting plate 120.

Optionally, the sizes of the two connecting plates 120 in the embodiments of the present application may be the same or different, and their sizes may be designed according to actual requirements.

It can be understood that, in the embodiments of the present application, mounting beams 121 may be provided on the two connecting plates 120. On this basis, mounting blocks 122 corresponding to the mounting beams 121 may be provided on the four protrusions 111.

Through the technical solution of the embodiments of the present application, the two second edges 1102 of the thermal management component 110 can respectively form recesses 112 to accommodate the two connecting plates 120. The mutual welding between the two connecting plates 120 and the thermal management component 110 will not create welding gaps, so as to ensure the airtightness of the box 100. Moreover, the mounting of the relevant components in the battery 10 by means of the mounting beams 121 on the two connecting plates 120 can further improve the mounting stability of the relevant components in the battery 10.

Figure 10:
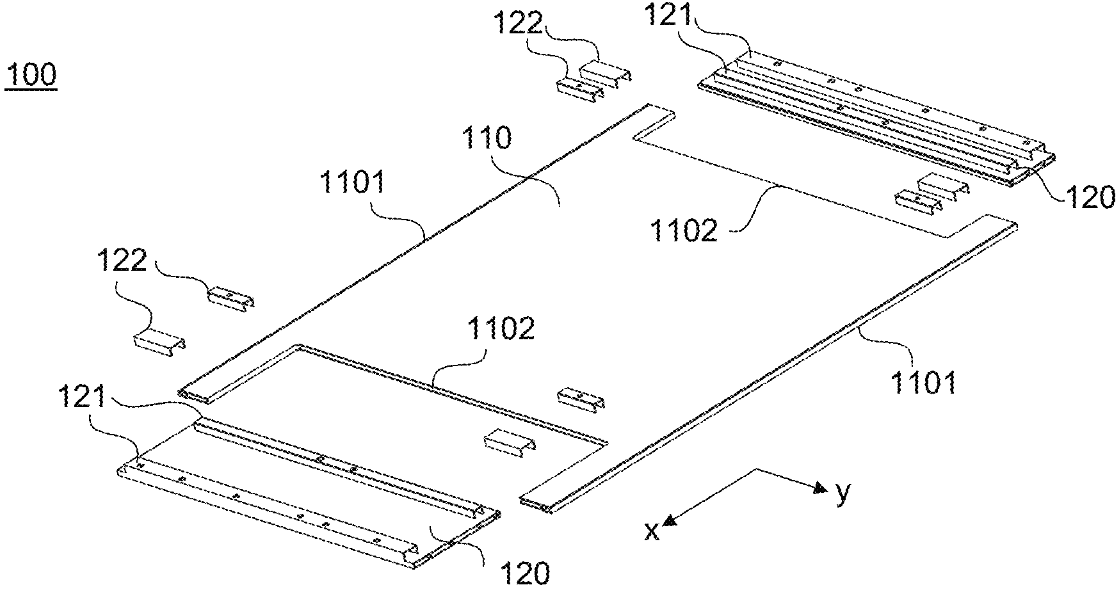
FIG. 10 is a schematic structural diagram of a box of a battery disclosed in another embodiment of the present application.

Based on the embodiment shown in FIG. 9, FIG. 10 shows a schematic structural diagram of a box 100 of a battery 10 provided in another embodiment of the present application.

As shown in FIG. 10, among the two connecting plates 120, two mounting beams 121 are provided on each connecting plate 120. On each connecting plate 120, the mounting beam 121 close to the thermal management component 110 is configured to mount the battery cell 20 or the battery module composed of the battery cell 20 inside the box 100. The mounting beams 121 are respectively provided the two ends of the thermal management component 110 for mounting the battery cell 20 or the battery module, so that it is possible to further improve the mounting stability of the battery cell 20 in the box 100.

Similarly, on each connecting plate 120, the mounting beam 121 away from the thermal management component 110 is configured to mount other parts of the box 100, so that it is also possible to improve the connection reliability between the thermal management component 110 integrated with the connecting plate 120 and other parts of the box 100.

Still referring to FIG. 10, on the basis that the mounting beams 121 are provided on the connecting plates 120, each of the four protrusions 111 is provided with two mounting blocks 122 to respectively cooperate with the two mounting beams 121 on the connecting plate 120, to realize the mounting of relevant components in the battery 10 and ensure the sealing of the box 100.

Figure 11:
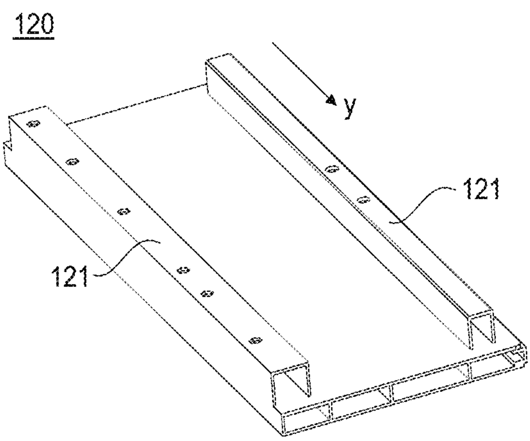
FIG. 11 is a schematic structural diagram of a connecting plate disclosed in an embodiment of the present application.

FIG. 11 shows a schematic structural diagram of a connecting plate 120 provided in an embodiment of the present application.

As shown in FIG. 11, in the embodiment of the present application, multiple cavity structures may be provided in the connecting plate 120. By providing a cavity structure in the connecting plate 120, the mass of the connecting plate 120 and the box 100 in which it is located can be reduced, thereby increasing the energy density of the battery 10. On this basis, the wall between adjacent cavity structures in the connecting plate 120 can be used to support the connecting plate 120 to ensure the stiffness and strength of the connecting plate 120.

In addition, the mounting beam 121 on the connecting plate 120 may also have a cavity structure, thereby further reducing the mass of the connecting plate 120 and the box 100 in which it is located.

As shown in FIG. 11, the extension length of the mounting beam 121 in the second direction y may be slightly less than the length of the connecting plate 120 in the second direction y. Two ends of the mounting beam 121 in the second direction y do not reach two edges of the connecting plate 120 in the second direction y such that when the connecting plate 120 abuts against the protrusion 111 in the thermal management component 110, there is a spacing between the end portion of the mounting beam 121 and the protrusion 111. In the embodiments, a stirring head required for the FSW process may be arranged in the spacing to facilitate welding of the connecting plate 120 and the protrusion 111 of the thermal management component 110.

In the above embodiments of the present application, the thermal management component 110 is of an integral structure. Optionally, in other alternative embodiments, the thermal management component 110 may alternatively include at least two parts that are welded to each other.

Figure 12:
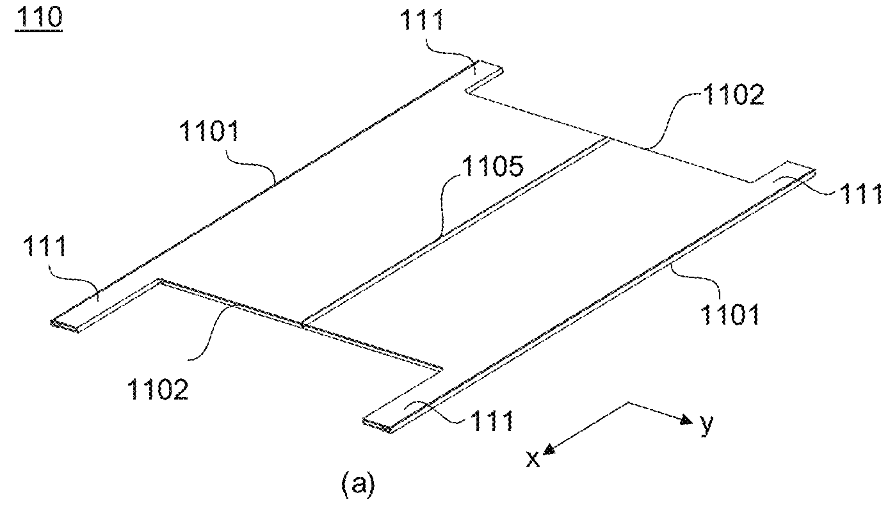
FIG. 12 is a schematic structural diagram of two thermal management components disclosed in an embodiment of the present application.
Figure 12:
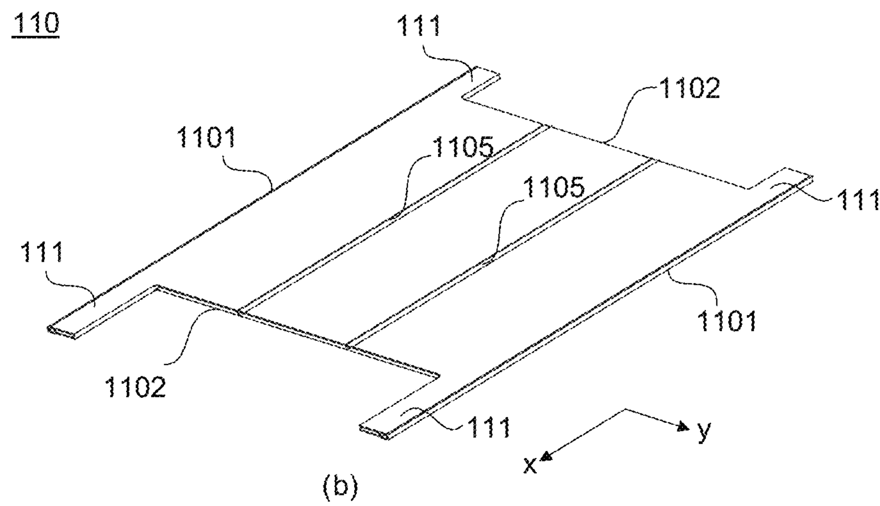

FIG. 12 shows a schematic structural diagram of two thermal management components 110 provided in an embodiment of the present application.

As shown in FIG. 12, in the embodiment of the present application, the thermal management component 110 includes: at least two parts welded to each other, and a weld seam 1105 between the at least two parts is parallel to the first edge 1101 and perpendicular to the second edge 1102.

Optionally, in the embodiment of the present application, the at least two parts of the thermal management component 110 may be welded to each other by an FSW process. The FSW process has less impact on the thermal management component 110 and can ensure the performance of the thermal management component 110 after welding.

As shown in FIG. 12(*a*), in this embodiment, the thermal management component 110 includes two parts, which are axially symmetrical with respect to the weld seam 1105. When the thermal management component 110 and the connecting plate 120 are welded to each other, a weld seam will also be formed at the second edge 1102 of the thermal management component 110. Therefore, where the weld seam 1105 is perpendicular to the second edge 1102, the weld seam 1105 is also perpendicular to the weld seam formed at the second edge 1102. In this embodiment, the thermal management component 110 may form an "I"- shaped weld seam, thereby enhancing the strength of the weld seam of the box 100, and further improving the overall strength of the box 100.

As shown in FIG. 12(*b*), in this embodiment, the thermal management component 110 includes three parts. After the three parts are welded to one another, two weld seams 1105 are formed. The two weld seams 1105 are parallel to each other and both perpendicular to the second edge 1102. In this embodiment, the thermal management component 110 may form an "II"-shaped weld seam, and can also enhance the strength of the weld seam of the box 100, thereby improving the overall strength of the box 100.

Through the technical solution of the embodiment of the present application, when the thermal management component 110 has a large area, the thermal management component 110 can be split into multiple parts and manufactured separately to ensure the manufacturing yield of each part and thus ensure the overall performance of the thermal management component 110. Moreover, an "I"-shaped weld seam may be formed in the thermal management component 110, so that the strength of the weld seam of the box 100 can be enhanced, thereby improving the overall strength of the box 100.

It should be noted that in the above description, FIG. 12 is only an example and not a limitation, showing the structures and weld seam shapes of two thermal management components 110. The thermal management component 110 may also be divided into more parts in a similar manner. The embodiments of the present application does not specifically limit the number of parts and the division method of the thermal management component 110.

Figure 13:
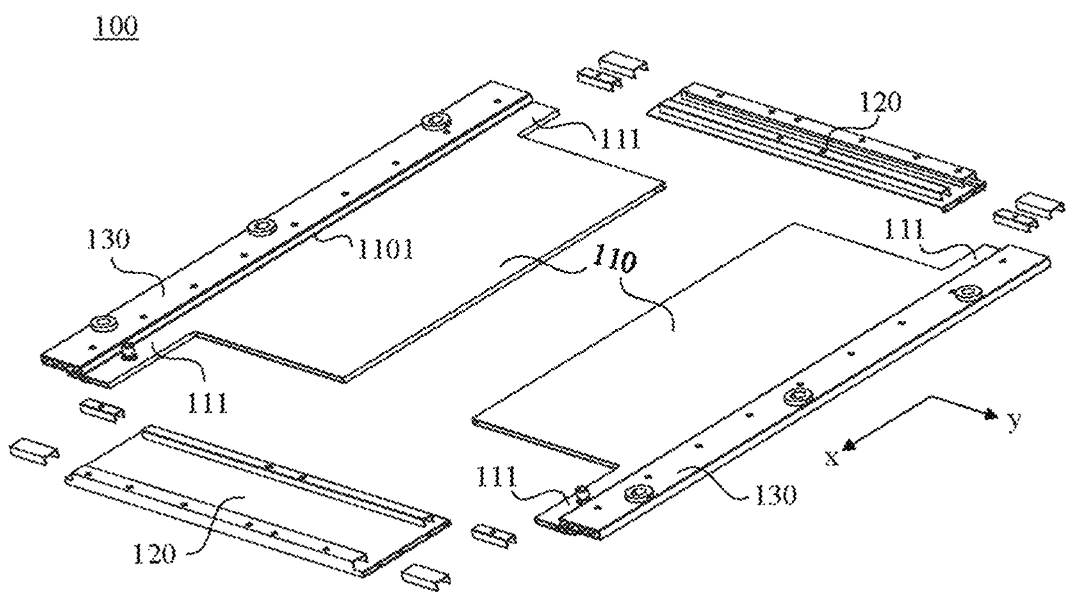
FIG. 13 is a schematic structural diagram of a box of a battery disclosed in another embodiment of the present application.

FIG. 13 shows a schematic structural diagram of a box 100 of a battery 10 provided in another embodiment of the present application.

As shown in FIG. 13, in the embodiment of the present application, a support beam 130 extending in the first direction x is provided on the first edge 1101 of the thermal management component 110 and the protrusion 111.

Specifically, in the embodiment of the present application, the support beam 130 is of an integrated structure, which extends in the first direction x and is provided on the first edge 1101 of the thermal management component 110 and the protrusion 111, and the extension length of the support beam 130 in the first direction x may be equal to or approximately equal to the sum of the lengths of the first edge 1101 and the protrusion 111 in the first direction x. The support beam 130 can support the entire box 100 in the first direction x, improve the overall stiffness and strength of the box 100, and ensure the usage reliability of the box 100.

Optionally, in some embodiments, the support beam 130 and the thermal management component 110 are of an integrated structure.

As an example, the support beam 130 and the thermal management component 110 are both made of a metal material, and they may be prepared by an integral forming process to form an integrated structure. Optionally, the support beam 130 and the thermal management component 110 are made of aluminum. The support beam 130 may be formed on the thermal management component 110 by an aluminum extrusion process, thereby forming an integrated structure.

Through the technical solution of the embodiments, the support beam 130 and the thermal management component 110 are designed as an integrated structure, so that it is possible to improve the connection strength of the support beam 130 on the thermal management component 110, thereby further improving the overall stiffness and strength of the box 100 to ensure the usage reliability of the box 100.

As shown in FIG. 13, optionally, in this embodiment, the thermal management component 110 may have a solution as shown in FIG. 12(*a*), including two parts that can be welded to each other. The thermal management component 110 includes four protrusions 111 and two recesses 112 for accommodating the two connecting plates 120.

Specifically, in this embodiment, the relevant technical solutions of the connecting plate 120, the thermal management component 110, the mounting beam 121, the mounting block 122 and other components can be referred to the relevant descriptions of the above embodiments, and will not be described in detail here.

It can be understood that, in the embodiment shown in FIG. 13, when the mounting block 122 is welded to the respective protrusion 111, its two ends in the second direction y may respectively abut against the support beam 130 and the mounting beam 121 to ensure the airtightness of the box 100.

Figure 14:
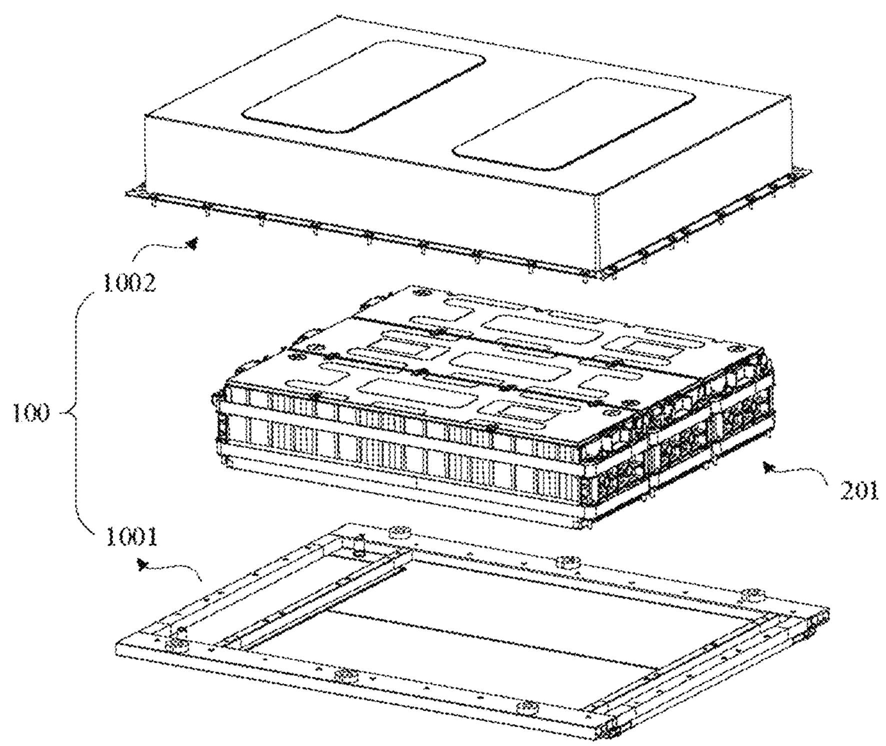
FIG. 14 is a schematic structural diagram of a box of a battery disclosed in another embodiment of the present application.

Based on the embodiment shown in FIG. 13, FIG. 14 shows a schematic structural diagram of a box 100 of a battery 10 provided in another embodiment of the present application.

As shown in FIG. 14, in the embodiment of the present application, the thermal management component 110 and the connecting plate 120 are connected to each other to form a bottom plate 1001 of the box 100.

The box 100 further includes an upper cover 1002 opposite to the bottom plate 1001. The upper cover 1002 and the bottom plate 1001 are interlocked with each other to form an accommodating space to accommodate the battery cell 20, or to accommodate a battery module 201 formed by a plurality of battery cells 20.

Optionally, the bottom plate 1001 may be a wall with a larger area of the box 100, which can provide relatively stable support for the battery cell 20 or the battery module 201, and improve the mounting stability of the box 100 in an electrical apparatus.

In addition, through the technical solution of the embodiment, when the battery 10 is in use, the bottom plate 1001 and the thermal management component 110 on the bottom plate 1001 are located on the side of the box 100 facing the direction of gravity. The thermal management component 110 can have a large area to achieve a better thermal management effect. In addition, even if a battery cell 20 in the battery module 201 is activated and the high-temperature emissions therein cause damage to the thermal management component 110, the fluid leaking from the thermal management component 110 will not affect other battery cells 20, thereby ensuring the normal operation of the other battery cells 20.

Optionally, in each of the above embodiments of the present application, the thermal management component 110 and the connecting plate 120 may be metallic aluminum. As mentioned above, this metallic aluminum material not only facilitates the formation of the mounting beam 121 on the connecting plate 120 by an aluminum extrusion process and the formation of the support beam 130 on the thermal management component 110, but also has the advantages of light weight, good thermal conductivity, easy processing, excellent corrosion resistance, and good strength; therefore, the thermal management component 110 made of the aluminum material can meet the requirements for both strength and thermal conductivity, and is also more suitable to be integrated into the box 100 as part of the box 100.

An embodiment of the present application further provides a battery 10. The battery 10 may include: a battery cell 20 and a box 100 in any one of the above embodiments. The box 100 is configured to accommodate the battery cell 20.

An embodiment of the present application further provides an electrical apparatus. The electrical apparatus may include a battery 10 in the above embodiment. The battery is 10 is configured to supply electric energy to the electrical apparatus.

Optionally, the electrical apparatus may be a vehicle 1, a ship or a spacecraft.

The battery 10 and the electrical apparatus according to the embodiments of the present application are described above, and a method and apparatus for preparing a battery according to the embodiments of the present application will be described below. For the parts not described in detail, reference can be made to the foregoing embodiments.

Figure 15:
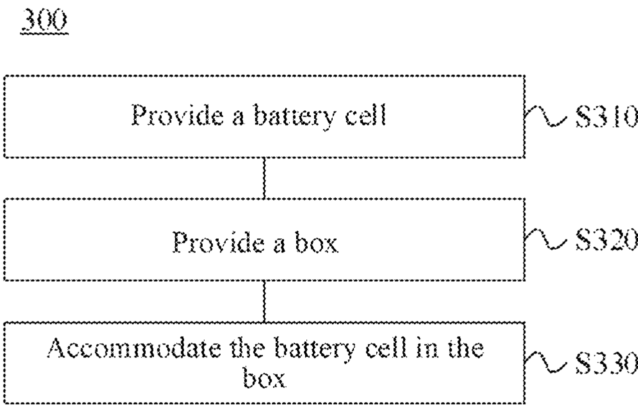
FIG. 15 is a schematic flowchart of a method for preparing a battery disclosed in an embodiment of the present application.

FIG. 15 shows a schematic flowchart of a method 300 for preparing a battery according to an embodiment of the present application. As shown in FIG. 15, the method 300 may comprise the following steps.

In S310, a battery cell 20 is provided.

In S320, a box 100 is provided.

The box 100 includes: a thermal management component 110, the thermal management component 110 being configured to accommodate a fluid to adjust the temperature of the battery cell 20, an end region of a first edge 1101 of the thermal management component 110 being provided with a protrusion 111 which protrudes outwardly in a first direction x, the first direction x being parallel to the first edge 1101 of the thermal management component 110, and the protrusion 111 and a second edge 1102 of the thermal management component 110 forming a recess 112; and a connecting plate 120 accommodated in the recess 112 and connected to the second edge 1102 and the protrusion 111.

In S330, the battery cell 20 is accommodated in the box 100.

Figure 16:
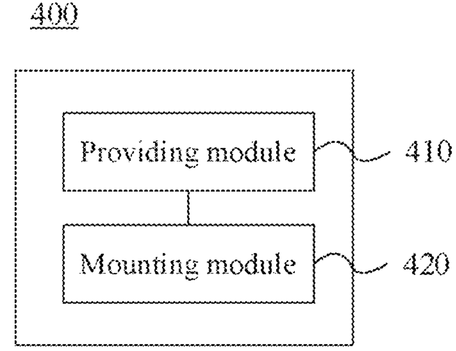
FIG. 16 is a schematic block diagram of an apparatus for preparing a battery disclosed in an embodiment of the present application.

FIG. 16 shows a schematic block diagram of an apparatus 400 for preparing a battery according to an embodiment of the present application. As shown in FIG. 16, the apparatus 400 for preparing a battery may include: a providing module 410 and an mounting module 420.

Specifically, the providing module 410 is configured to provide a battery cell 20 and a box 100.

The box 100 includes: a thermal management component 110, the thermal management component 110 being configured to accommodate a fluid to adjust the temperature of the battery cell 20, an end region of a first edge 1101 of the thermal management component 110 being provided with a protrusion 111 which protrudes outwardly in a first direction x, the first direction x being parallel to the first edge 1101 of the thermal management component 110, and the protrusion 111 and a second edge 1102 of the thermal management component 110 forming a recess 112; and a connecting plate 120 accommodated in the recess 112 and connected to the second edge 1102 and the protrusion 111.

The mounting module 420 is configured to accommodate the battery cell 20 in the box 100.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A box of a battery, comprising:

a thermal management component configured to accommodate a fluid to adjust the temperature of the battery, an end region of a first edge of the thermal management component being provided with a protrusion which protrudes outwardly in a first direction (x), the first direction (x) being parallel to the first edge of the thermal management component, and the protrusion and a second edge of the thermal management component forming a recess; and a connecting plate accommodated in the recess and connected to the second edge and the protrusion;

wherein a mounting beam is provided on the connecting plate, and the mounting beam extends in a second direction (y) parallel to the second edge and is configured to mount components in the battery;

wherein the box further includes: a mounting block provided on the protrusion, the mounting block abuts against the mounting beam, and the mounting block cooperates with the mounting beam and is configured to mount components in the battery, wherein a flow channel cavity is provided in the thermal management component, and a water access cavity is provided in the protrusion, wherein a cavity wall of the flow channel cavity that faces the mounting block has a thickness less than a thickness of a cavity wall of the water access cavity that faces the mounting block.

2. The box according to claim 1, wherein the connecting plate is welded to the second edge and the protrusion by a friction stir welding process.

3. The box according to claim 1, wherein a cavity wall of the flow channel cavity has a thickness less than or equal to 1.5 mm.

4. The box according to claim 1, wherein the mounting beam and the connecting plate are of an integrated structure.

5. The box according to claim 1, wherein the mounting block is welded to the protrusion by an arc welding process.

6. The box according to claim 5, wherein a cavity wall of the water access cavity that faces the mounting block has a thickness greater than or equal to 2 mm.

7. The box according to claim 1, wherein the thermal management component comprises two first edges parallel to each other, and end regions of the two first edges that are located on the same side are each provided with the protrusion which protrudes outwardly in the first direction (x); and the second edge is connected to the two protrusions to form the recess.

8. The box according to claim 7, wherein end regions located on two sides of each of the two first edges are each provided with the protrusion which protrudes outwardly in the first direction (x); and the thermal management component comprises two second edges parallel to each other, and each second edge is connected to two respective protrusions to form one recess.

9. The box according to claim 1, wherein the thermal management component comprises: at least two parts welded to each other, and a weld seam between the at least two parts is parallel to the first edge and perpendicular to the second edge.

10. The box according to claim 1, wherein a support beam extending in the first direction (x) is provided on the first edge of the thermal management component and the protrusion.

11. The box according to claim 10, wherein the support beam and the thermal management component are of an integrated structure.

12. The box according to claim 1, wherein the thermal management component and the connecting plate are connected to each other to form a bottom plate of the box; and/or wherein the thermal management component and the connecting plate are made of aluminum.

13. A battery, comprising: a battery cell, and a box of claim 1, the box being configured to accommodate the battery cell.

14. An electrical apparatus, comprising: a battery of claim 13, the battery being configured to supply electric energy to the electrical apparatus.

15. A method for preparing a battery, comprising:

providing a battery cell;

provide a box, the box comprising:

a thermal management component configured to accommodate a fluid to adjust the temperature of the battery cell, an end region of a first edge of the thermal management component being provided with a protrusion which protrudes outwardly in a first direction (x), the first direction (x) being parallel to the first edge of the thermal management component, and the protrusion and a second edge of the thermal management component forming a recess; and a connecting plate accommodated in the recess and connected to the second edge and the protrusion; and accommodating the battery cell in the box;

wherein a mounting beam is provided on the connecting plate, and the mounting beam extends in a second direction (y) parallel to the second edge and is configured to mount components in the battery;

wherein the box further includes: a mounting block provided on the protrusion, the mounting block abuts against the mounting beam, and the mounting block cooperates with the mounting beam and is configured to mount components in the battery, wherein a flow channel cavity is provided in the thermal management component, and a water access cavity is provided in the protrusion, wherein a cavity wall of the flow channel cavity that faces the mounting block has a thickness less than a thickness of a cavity wall of the water access cavity that faces the mounting block.

* * * * *